(12) United States Patent
Kobayashi et al.

(10) Patent No.: US 6,181,543 B1
(45) Date of Patent: Jan. 30, 2001

(54) HIGH VOLTAGE CERAMIC CAPACITOR

(75) Inventors: Shinichi Kobayashi, Izumo; Makoto Murata, Shiga-ken; Toshiya Esumi, Hirata; Akemi Ubata, Izumo, all of (JP)

(73) Assignee: Murata Manufacturing Co., Ltd. (JP)

( * ) Notice: Under 35 U.S.C. 154(b), the term of this patent shall be extended for 0 days.

(21) Appl. No.: 09/273,192

(22) Filed: Mar. 19, 1999

(30) Foreign Application Priority Data

Mar. 19, 1998 (JP) .................................................. 10-070825

(51) Int. Cl.$^7$ .............................. H01G 4/00; H01G 4/228
(52) U.S. Cl. ..................................... 361/301.3; 361/308.1; 361/309; 361/321.2
(58) Field of Search ................................. 361/301.3, 311, 361/312, 321.1–321.6, 328–329, 309, 308.1, 310; 174/52.2; 257/790, 788

(56) References Cited

U.S. PATENT DOCUMENTS

| | | | | |
|---|---|---|---|---|
| 3,946,290 | * | 3/1976 | Yoshioka et al. | 361/306.1 |
| 4,939,620 | * | 7/1990 | Arakawa et al. | 361/321.1 |
| 5,587,869 | * | 12/1996 | Azumi et al. | 361/301.3 |

* cited by examiner

*Primary Examiner*—Anthony Dinkins
(74) *Attorney, Agent, or Firm*—Ostrolenk, Faber, Gerb & Soffen, LLP

(57) ABSTRACT

A high voltage ceramic capacitor includes a capacitor device, which is connected to a pair of metal terminals and which is housed in a ceramic housing. A first resin layer and a second resin layer separated by a space in the connecting direction of the two metal terminals are arranged such that the capacitor device and the contact portions between the capacitor device and the metal terminals are sealed airtight.

15 Claims, 4 Drawing Sheets

HIGH VOLTAGE CERAMIC CAPACITOR

BACKGROUND OF THE INVENTION

1. Field of the Invention

The present invention relates to a high voltage ceramic capacitor, and in particular, a high voltage ceramic capacitor which is suitable for use in environments requiring halogen resistance. Such capacitors are useful, for example, in an atmosphere containing halogen gas, such as a high voltage ceramic capacitor for an excimer laser apparatus.

2. Description of the Related Art

A high voltage ceramic capacitor is conventionally used for discharge excitation in an excimer laser apparatus. Because it is used in an atmosphere containing halogen gas, it must be resistant to halogen.

A high voltage ceramic capacitor 51 which is designed to be halogen resistant is shown in FIG. 5 and disclosed in Japanese Unexamined Patent Publication No. 8-130158. The high voltage ceramic capacitor 51 includes a capacitor device 52 made of a dielectric ceramic having electrodes 52b, 52c on the top and bottom surfaces 52a thereof. Metal terminals 53, 54 are connected to the electrodes 52b, 52c of the capacitor device 52, respectively.

The capacitor device 52 is arranged in a housing 55. The housing 55 includes a housing body 55a which is open at the top and a lid member 55b which covers the opening. The housing body 55a and the lid member 55b are made of aluminum oxide, which is superior in halogen resistance. One of the metal terminals 53 passes through the lid member 55b, and the other of the metal terminals 54 passes through the bottom of the housing body 55a.

A series of seals are formed to increase the halogen resistance of the capacitor device 57. Seal members 56, 57, made of elastic rings or the like, are arranged between each of the two metal terminals 53, 54 and the housing 55, respectively, to form airtight seals. Another seal member 58, made of an elastic ring, is arranged at the contact surface between the housing body 55a and the lid member 55b to form an airtight seal. Finally, the housing 55 is filled with an epoxy resin 59 to increase halogen resistance.

Because housing 55 made of aluminum oxide and having the above-described airtight sealing construction is used and because an epoxy resin 59 having superior halogen resistance is used to encase the capacitor device 52 and the metal terminals 53, 54 (other than protruding portions of the metal terminals 53, 54), the high voltage ceramic capacitor 51 exhibits an increased halogen resistance.

Another high voltage ceramic capacitor is disclosed in Japanese Unexamined Patent Publication No. 7-230933. This high voltage ceramic capacitor has a configuration in which a capacitor device has electrodes on two main surfaces, the electrodes being connected to metal terminals, and is arranged in an airtight sealed housing made of a ceramic material. In this construction, the tips of the metal terminals protrude outwardly from the airtight sealed housing. A hole is provided with the metal terminals so that the hole passes through from the outside of the housing to the inside thereof. Gases are removed from the inside of the airtight sealed housing through the hole, so that the pressure in the airtight sealed housing is reduced. Then, the airtight sealed housing is filled with an insulating protective material such as an epoxy resin, a silicone resin, a urethane resin, or the like.

In the conventional high voltage ceramic capacitors disclosed in Japanese Unexamined Patent Publication Nos. 8-130158 and 7-230933, when the assembled device, in which a pair of metal terminals are connected to the capacitor device, is arranged in the housing, the resin (epoxy, silicone, urethane, or the like) is filled in as an insulating protective material. However, when epoxy resin is used, the coefficient of linear expansion of the cured epoxy resin is significantly greater than that of the ceramic which makes up the housing. Therefore, cracking may occur in the epoxy resin during curing and shrinking.

When cracks occur in the epoxy resin, the insulation performance of the capacitor deteriorates and lowers the voltage which the capacitor can tolerate. In addition, each component of the high voltage ceramic capacitor reacts with the halogen gas generating secondary gas and dust and polluting the gas atmosphere.

When silicone resin or urethane resin is used instead of epoxy resin, the above-described cracking can be avoided by virtue of its superior elasticity. However, silicone resin and urethane resin are significantly affected by halogen gas, in particular by fluorine gas. When the fluorine gas content increases slightly, the resin becomes fluid.

In the above-described high voltage ceramic capacitor 51, the housing 55 is sealed airtight with seal members 56 to 58 in the form of elastic rings. However, the seal members do not function satisfactorily. Therefore, penetration by halogen gas such as fluorine gas cannot be completely prevented. When silicone resin or urethane resin is used instead of epoxy resin 59, the resin is fluidized leading to separation of the lid member 55b. As a result, the fluidized resin material leaks into the excimer laser apparatus causing deterioration of the gas atmosphere.

Therefore, silicone resin and urethane resin cannot be used in place of epoxy resin 59 in the high voltage ceramic capacitor 51. Thus, as disclosed in Japanese Unexamined Patent Publication No. 7-230933, an airtight sealed housing must be used. However, the airtight sealed housing does not have perfect sealing ability, and therefore halogen gas may enter the housing. When halogen gas enters the housing, the resin is fluidized, causing the same problems described above.

In addition, in the conventional high voltage ceramic capacitor, an insulating protective resin which fills the housing may expand, causing, for example, the lid member of the housing to open during use.

SUMMARY OF THE INVENTION

Accordingly, it is an object of the present invention to provide a high voltage ceramic capacitor in which a capacitor device connected to a metal terminal is arranged in a housing, and resin is filled therein, the filled resin is not susceptible to cracking, and the halogen resistance thereof is excellent.

In accordance with the present invention, a high voltage ceramic capacitor includes:

- a capacitor device comprising a dielectric ceramic capacitor body having first and second opposed surfaces and first and second electrodes located on said first and second surfaces, respectively;
- first and second metal terminals connected to said first and second electrodes, respectively;
- a ceramic housing having a housing cavity which houses said capacitor device and at least a portion of said first and second metal terminals; and
- first and second resin layers provided in said housing cavity and surrounding at least a portion of said first and second metal terminals, respectively, said first and second resin layers being separated by an empty space therebetween.

With this arrangement, the space which is formed between the first resin layer and the second resin layer can absorb stress during curing and shrinking of the resin in the resin layer. Therefore, occurrence of cracking in the first resin layer and the second resin layer can be prevented. That is, in the conventional high voltage ceramic capacitor in which only epoxy resin is filled, cracking tends to occur in the epoxy resin due not only to significant shrinkage stress during curing and shrinking but also to stress during cooling due to the difference between the coefficients of linear expansions of the resin and the ceramic. On the other hand, with respect to the high voltage ceramic capacitor in accordance with the present invention, the above-described stresses are relieved by the presence of the empty space between the two resin layers, so that occurrence of cracking in the resin can be prevented. In addition, a ceramic housing component such as a lid member is not lifted by expansion of the resin layers.

Thus, since the capacitor device and the contact portions between the capacitor device and the first and second metal terminals are securely sealed airtight by the first resin layer and the second resin layer, it is possible to provide an optimal high voltage ceramic capacitor which is suitable for use in an atmosphere containing a halogen gas, such as a discharge excitation capacitor for an excimer laser apparatus, and which has superior halogen resistance.

Furthermore, the capacitor device may include a resin outer coating including an epoxy resin provided around the capacitor device in the ceramic housing. With this arrangement the voltages at which the capacitor device may operate are improved.

Furthermore, the resin layer may be cured at a temperature above the maximum operating temperature of the capacitor device. With this arrangement, the resin does not expand during actual use. Therefore, a component of the ceramic housing such as a lid member can be prevented from separating.

Furthermore, the ceramic housing may include a housing body having an opening at a first surface of the capacitor device, and a lid member fixed to the housing body so as to close the opening. With this arrangement, the assembled device, in which the first metal terminal and the second metal terminal are connected to the capacitor device, can be easily be placed into the housing from the opening portion of the ceramic housing body. In addition, resin which makes up the resin layers can be easily filled into the housing.

Furthermore, the ceramic housing may include aluminum oxide so as to have superior halogen resistance. The aluminum oxide preferably has superior halogen resistance, and more preferably contains five percent by weight or less of silicon. With this arrangement, the housing itself has even greater superior halogen resistance.

In addition, the first resin layer and the second resin layer preferably include an epoxy resin, which has halogen resistance. With this arrangement, there is provided a high voltage ceramic capacitor which has even greater superior halogen resistance.

BRIEF DESCRIPTION OF THE DRAWINGS

For the purpose of illustrating the invention, there is shown in the drawing several forms which are presently preferred, it being understood, however, that the invention is not limited to the precise arrangements and instrumentalities shown.

DESCRIPTION OF THE PREFERRED EMBODIMENTS

Features and advantages of the present invention will become clear from the following description of the preferred embodiments taken in conjunction with the accompanying drawings. The following embodiments are illustrative of the invention, but have no limiting significance.

Figure 1:
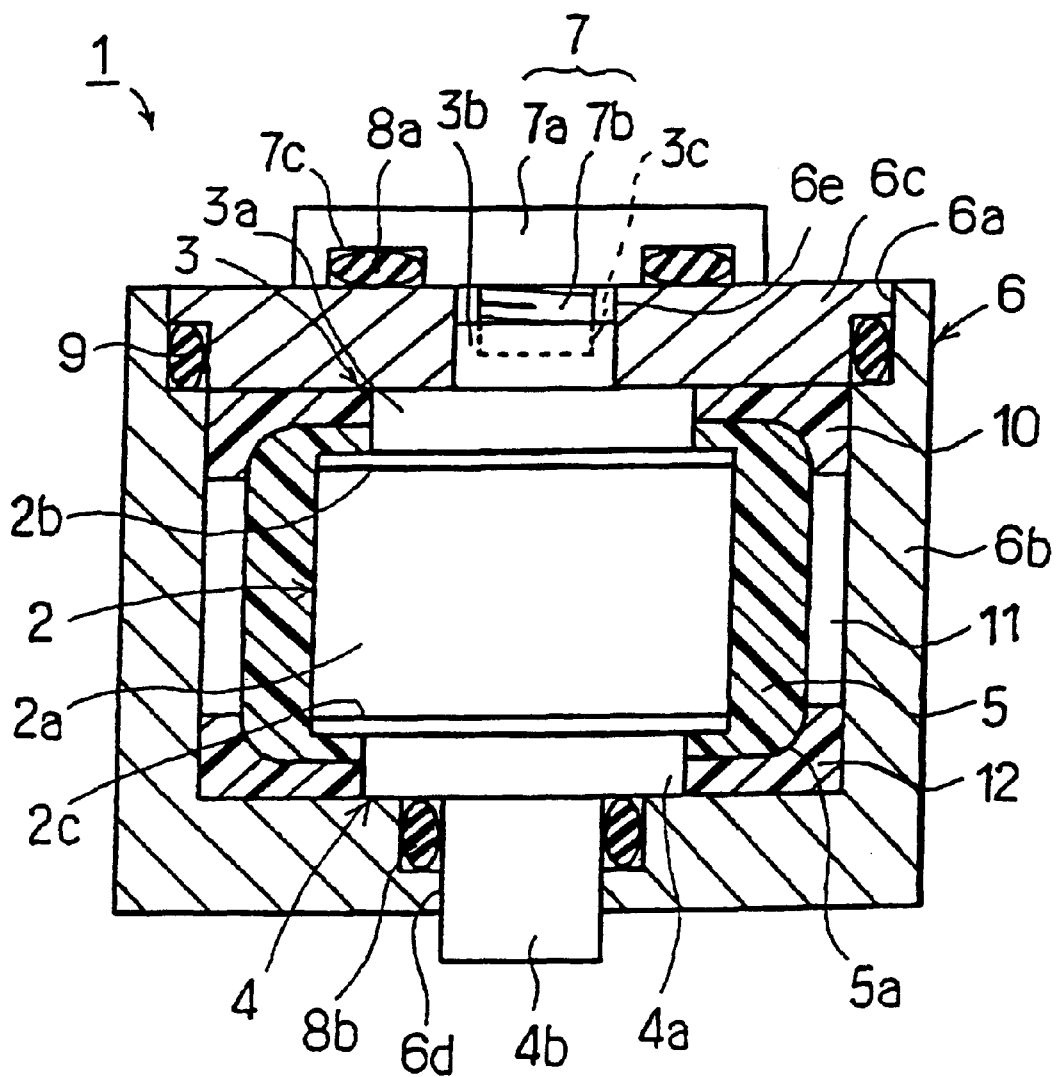
FIG. 1 is a cross-sectional view of a high voltage ceramic capacitor according to a first embodiment of the present invention.

FIG. 1 is a cross-sectional view of a high voltage ceramic capacitor according to a first embodiment of the present invention. The high voltage ceramic capacitor 1 is preferably used for discharge excitation in an excimer laser apparatus. However, the present invention is not limited to such uses.

The high voltage ceramic capacitor 1 comprises a capacitor device 2 having a first electrode 2b and a second electrode 2c formed on first and second opposite surfaces, respectively, of a disk like or cylindrical capacitor body 2a.

The capacitor device element 2a is made of a dielectric ceramic, for example a strontium titanate dielectric ceramic. The electrodes 2b and 2c may be made of any appropriate material. In the preferred embodiment, the electrodes 2b and 2c are formed by applying an Ag paste to the capacitor device element 2a and baking the paste.

A first metal terminal 3 and a second metal terminal 4 are, respectively, connected to the electrodes 2b and 2c of the capacitor device 2 by adhesion, soldering, waxing or the like. The metal terminals 3 and 4 are made of an appropriate metal material, and the exteriors thereof are preferably covered with a metal such as Ni, Ag, and Au. Since the covering layer is made of a metal such as Ni, Ag, and Au, the resistance of the metal terminals 3 and 4 to halogen is improved.

The metal terminals 3 and 4 comprise flange portions 3a and 4a to which the electrodes 2b and 2c, respectively, is connected. Metal terminal body portions 3b and 4b are connected to the flange portions 3a and 4a.

Figure 2A:
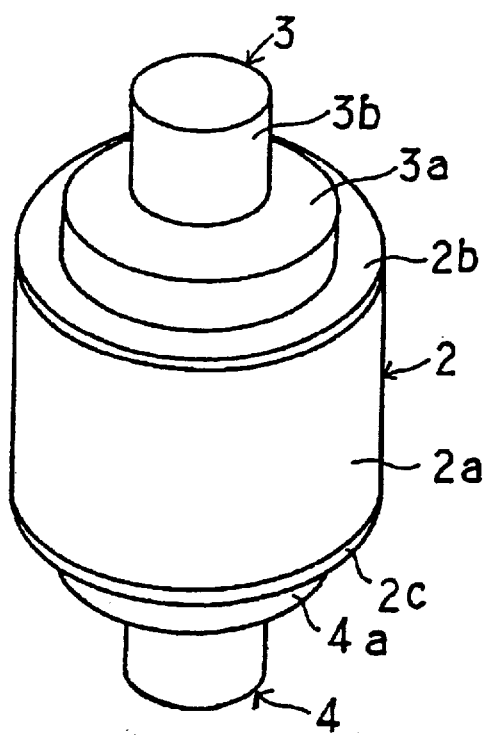
FIG. 2A i s a perspective view of a capacitor device to which a first and a second metal terminal are connected.
Figure 2B:
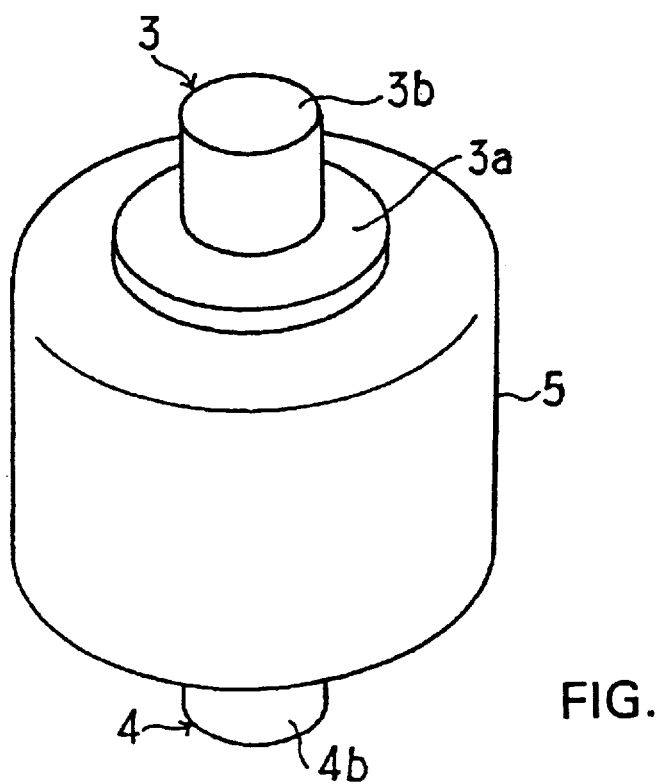
FIG. 2B is a perspective view of the capacitor device shown in FIG. 2A in which a resin outer coating is formed at the exterior thereof.

FIG. 2A is a perspective view of the capacitor device 2 to which the metal terminals 3 and 4 are connected. As shown in FIG. 2B, an epoxy resin outer coating 5 covers the capacitor device 2 and about one-half of the height of the flange portions 3a and 4a.

When the high voltage ceramic capacitor 1 is assembled, the metal terminals 3 and 4 are connected to the capacitor device 2, and the resin outer coating 5 is formed. Then, the assembled device covered with the resin outer coating 5 is placed into a housing body 6b of a ceramic housing 6 as shown in FIG. 1.

The ceramic housing 6 comprises a housing body 6b having an opening portion 6a at the top thereof, and a lid member 6c, which is mounted so as to close the opening portion 6a. The housing body 6b and the lid member 6c are made of a ceramic, preferably aluminum oxide having superior halogen resistance, and are more preferably made of aluminum oxide containing silicon at not more than 5% by weight. A through hole 6d is formed at the bottom of the housing body 6b.

When the high voltage ceramic capacitor is assembled, the capacitor device 2, to which the metal terminals 3 and 4 are connected and around which the resin outer coating 5 is formed, is placed into the housing body 6b. The metal terminal body portion 4b of the metal terminal 4 is inserted into the through hole 6d and the distal end of the metal terminal 4 protrudes from the through hole 6d. Then, a second resin layer 12 and a first resin layer 10 are formed in such a manner that each resin is filled in the above-mentioned order.

The resin material which makes up the first resin layer 10 and the second resin layer 12, is preferably an epoxy resin. However, other resins, for example, an allyl resin, can be used, as long as the resin has sufficient halogen resistance. An epoxy resin is most preferable because of its pourability and cost.

Any method for applying the resin which makes up the resin layers 10, 12 can be used as long as a space 11 is formed therebetween. One suitable method that can be used will be described below.

In order to form the second resin layer 12, an epoxy resin, which is preferably a flexible resin, is filled to a point above a curved portion 5a at the lower region of the resin outer coating 5, and is heated at a temperature of 60° C. for four hours to cure.

Next, the same type and the same amount of the epoxy resin which is used for the second layer 12 is poured from the opening portion 6a. Then, the lid member 6c is mounted using a pressure terminal 7. The lid member 6c includes a through hole 6e which receives the metal terminal body portion 3b of the upper metal terminal 3.

The pressure terminal 7 is preferably made of metal, and comprises a flange portion 7a and an externally threaded protruding portion 7b which mates with an internally threaded recess 3c formed in the tip of the metal terminal body portion 3b of the metal terminal 3. Particularly, the pressure terminal 7 is screwed onto the housing through the cooperation of the threaded protruding portion 7b and the threaded recess 3c. In this manner, the lid member 6c is mounted to close the opening portion 6a so that the lid member 6c is fixed to the housing body 6b.

Then, the entire high voltage ceramic capacitor 1 is turned upside-down. The uncured epoxy resin, which had previously been pored into the high voltage ceramic capacitor 1, flows downwardly to the lid member 6c side. In this position, the uncured epoxy resin is cured so as to form the first resin layer 10 by heating under a condition, for example, at a temperature of 60° C. for four hours. Since the epoxy resin, which makes up the first resin layer 10, is cured after the inversion operation, a space 11 is formed between the first resin layer 10 and the second resin layer 12.

As shown in FIG. 1, seal members 8a, 8b, and 9 are preferably used to form an airtight seal for the ceramic housing 6. These seal members 8a, 8b, and 9 are made of an elastic material such as an O-ring, and are preferably made of a seal material made of fluororubber having superior halogen resistance.

The seal member 8a sits in a ring shaped recess 7c formed in the lower surface of the flange portion 7a of the pressure terminal 7 to form an airtight seal for the ceramic case 6 above the region in which the metal terminal 3 is formed. The lower surface of the flange portion 7a of the pressure terminal 7 is compressively connected to the upper surface of the lid member 6c via the seal member 8a, so that the pressure terminal 7 and the lid member 6c are sealed airtight.

The seal member 8b is arranged at the inside surface of the through hole 6d to form an airtight seal between the peripheral surface of the metal terminal body portion 4b of the second metal terminal 4 and the inside surface of the through hole 6d. The seal member 9 is arranged at the contact surface of the lid member 6c and the housing body 6b to form an airtight seal.

In accordance with the present embodiment, the first resin layer 10 and the second resin layer 12 are arranged so as to be separated by the space 11 in the direction from the first metal terminal 3 to the second metal terminal 4 in such a manner that the capacitor device 2 and the contact region between the capacitor device 2 and the metal terminals 3 and 4 are sealed airtight in the ceramic case 6 which is sealed airtight by the above-described seal members 8a, 8b, and 9. Therefore, when stress caused by the difference between the coefficients of linear expansions of the resin and the ceramic is applied to the first resin layer 10 and the second resin layer 12 during curing of the first and second resin layers 10, 12, the stress is absorbed by the space 11. This avoids the formation of cracks in the first and second resin layers 10, 12 with the result that the halogen resistance in the ceramic housing 6 is significantly improved.

Furthermore, the contact regions between the ceramic housing 6 and the metal terminals 3 and 4, and the contact region between the housing body 6b and the lid member 6c are sealed by seal members 8a, 8b, and 9, so that the integrity of the seal at the contact regions between the capacitor device 2 and the metal terminals 3 and 4 is significantly improved.

The effect of a high voltage ceramic capacitor in accordance with the present embodiment will be described with reference to several substantive experiments.

Electrodes 2b and 2c made of Ag having a diameter of 38 mm were formed on two surfaces of a capacitor body 2a made of a strontium titanate dielectric ceramic having an external diameter of 40 mm and a thickness of 16 mm by baking. Then, a first metal terminal 3 and a second metal terminal 4 were conductively connected to the electrodes 2b and 2c, the metal terminals 3 and 4 having an area of 300 mm$^2$ at the contact region of the electrodes 2b and 2c, and including metal terminal body portions 3b and 4b having a diameter of 15 mm. Then, a capacitor device 2 and parts of the metal terminals 3 and 4 were covered with an epoxy resin, such that a resin outer coating 5 was formed. The resultant half-finished product was arranged in a ceramic housing 6 (content of silicon was 0.5% by weight) using the same procedure as in the above-described first embodiment. Then, a first resin layer 10 and a second resin layer 12 were heated and cured using the same procedure as in the above-described first embodiment, so that a high voltage ceramic capacitor 1 was obtained.

A temperature cycle test and a repeated compression and decompression test were conducted on this capacitor as described below. The results are shown in Table 1.

(1) Temperature Cycle Test

A single temperature cycle consisted of maintaining the high voltage ceramic capacitor at a temperature of -20° C. for two hours, heating it to a temperature of 60° C., maintaining the capacitor at a temperature of 60° C. for two hours, and cooling the capacitor to a temperature of -20° C. Evaluation was performed by observing occurrence of gaps between a lid member and a housing body and by measuring the voltage it could tolerate. When voltage it could tolerate was not more than 60 kV, it was determined to be defective with respect to tolerable voltage.

(2) Repeated Compression and Decompression Test

A single cycle consisted of maintaining the high voltage ceramic capacitor standing in a compressed atmosphere of 3 kg/cm² for one hour, maintaining the capacitor in a decompressed atmosphere of 1 Torr for one hour. Repeated compression and decompression tests were so performed. Occurrence of gaps between the lid member and the housing body was ascertained by visual observation.

TABLE 1

|  | 5 cycles | 10 cycles | 20 cycles | 50 cycles |
|---|---|---|---|---|
| Temperature cycle test −20 to 60° C. | No failure | No failure | No failure | No failure |
| Repeated Compression and decompression test 3 kg/cm² to 1 Torr | No failure | No failure | No failure | No failure |

In the tests whose results are shown in Table 1, ten samples were used in each of the temperature cycle tests and each of the repeated compression and decompression tests.

As shown in Table 1, although 50 temperature cycle tests and 50 repeated compression and decompression tests were conducted, raising of the lid member 6c and the occurrence of cracking at the first resin layer 10 and the second resin layer 12 were not observed.

In the above-described first embodiment, a capacitor device 2 and parts of metal terminals 3 and 4 are covered with a resin outer coating 5. However, the resin outer coating 5 may be omitted. The capacitor device 2 which is connected to the metal terminals 3 and 4 can be simultaneously improved in handling quality and in performance of the voltage it will tolerate by providing the resin outer coating 5, so that the resin outer coating 5 is preferably provided.

In addition, the capacitor device 2 can be made of a proper dielectric ceramic such as a barium titanate ceramic other than a strontium titanate ceramic. Furthermore, the first resin layer 10 and the second resin layer 12 are preferably cured at temperatures above the maximum operating temperature of the capacitor device 2. That is, the high voltage ceramic capacitor in accordance with the present embodiment is used for an excimer laser apparatus, and the maximum operating temperature thereof is about 50° C. during actual use. On the other hand, the curing temperature of the first resin layer 10 and the second resin layer 12 is 60° C. as described above. Therefore, the first resin layer 10 and the second resin layer 12 do not expand at a temperature of 50° C. which is the maximum operating temperature of the high voltage ceramic capacitor 1 during actual use. Thus, the lid member 6c will not separate from housing body 6b.

The inventors of the present invention manufactured another sample high voltage ceramic capacitor 1 in the same way as for manufacturing the high voltage ceramic capacitor 1 in accordance with the above-described embodiment but the first resin layer 10 and the second resin layer 12 were cured at a temperature of 40° C. Then, when the high voltage ceramic capacitor stood at a temperature of 50° C., it was confirmed that the lid member 6c gradually opened. Therefore, when the maximum operating temperature during actual use is 50° C., the curing temperature of the first resin layer 10 and the second resin layer 12 should preferably be higher than 50° C. so as to prevent the subsequent opening of the lid member 6c.

Figure 3:
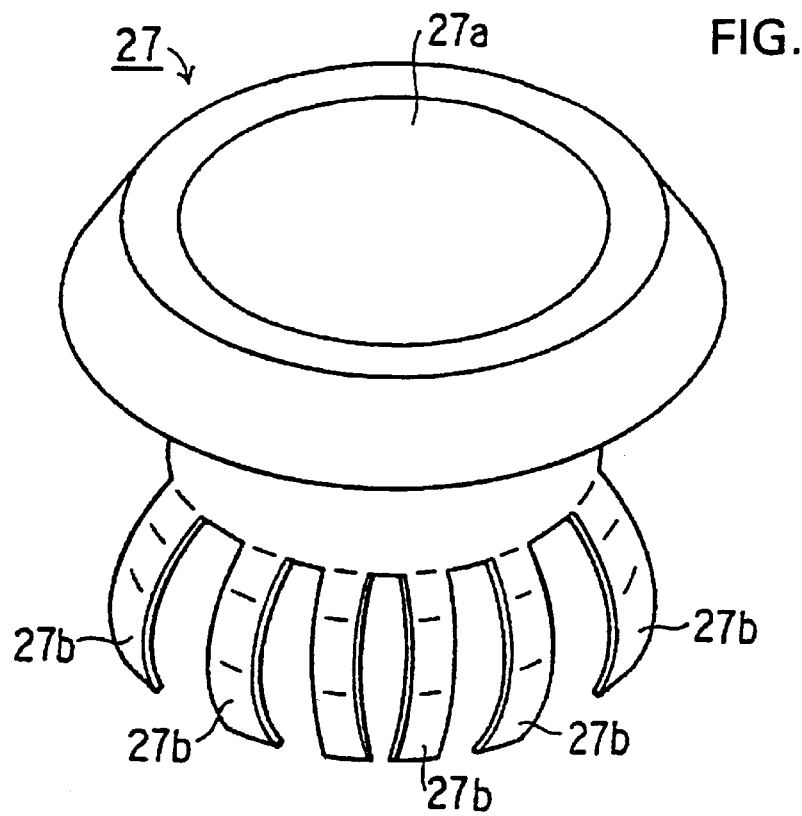
FIG. 3 is a perspective view showing pressure terminals according to a modified embodiment of the present invention.
Figure 4:
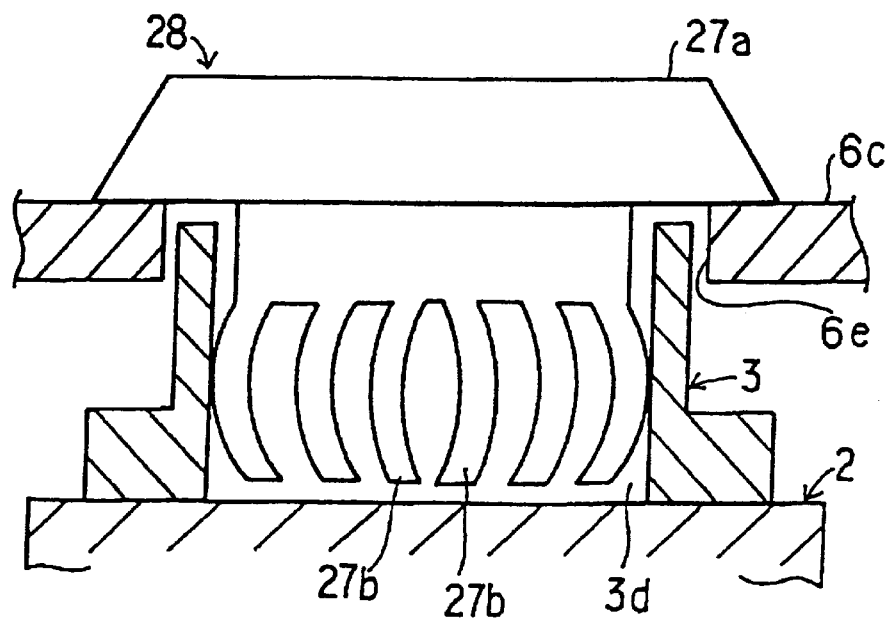
FIG. 4 is a partial cutaway sectional view showing a fixed construction of a first metal terminal and the pressure terminals according to the modified embodiment shown in FIG. 3.
Figure 5:
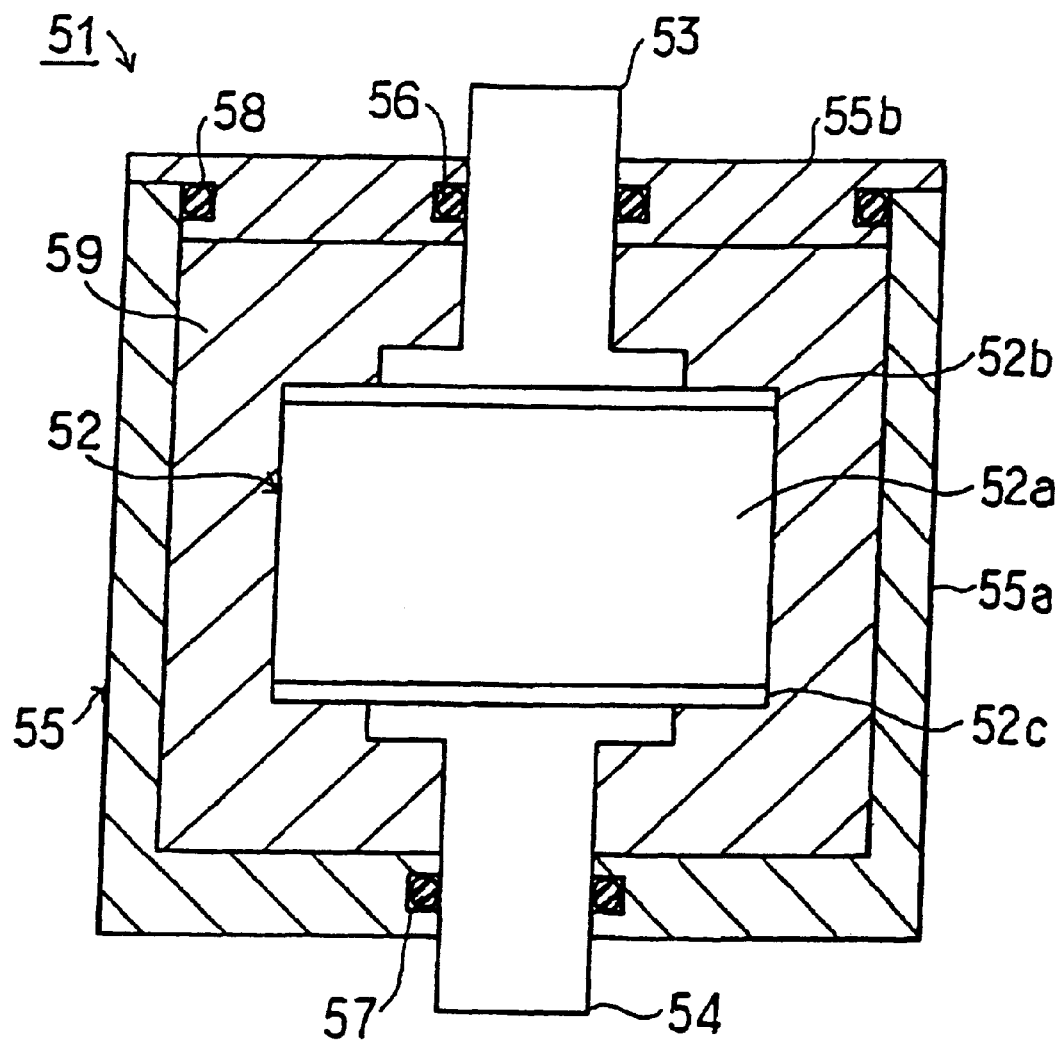
FIG. 5 is a cross-sectional view of one example of a conventional high voltage ceramic capacitor.

In the above-described first embodiment, the lid member 6c is fixed to the housing body 6b, an internally threaded screw hole is formed in the metal terminal body portion 3b of the first metal terminal 3, and a pressure terminal 7 which is screwed into the screw hole. When a high voltage ceramic capacitor 1 is used at low current, the pressure terminal may instead be fixed to the metal terminal 3 using the urging force of a spring. Referring to FIGS. 3 and 4, the pressure terminal using the spring will be described below.

A pressure terminal 27 shown in FIG. 3 has a region, which is inserted into a through hole in a lid member, below a lower surface of flange portion 27a. A plurality of spring forked portions 27b are provided at the tip of the inserting region. The spring forked portions 27b are elongated in the width direction, and the middle areas thereof (as measured in the height direction) curve convexly and outwardly. Therefore, when a force is applied to the plurality of spring forked portions 27b in the central direction in the state shown in FIG. 3, an outwardly directed force arises in the diameter direction.

As shown in FIG. 4, a hole 3d is formed in the first metal terminal 3. The hole 3d is elongated from the tip of the first metal terminal 3 in the length direction. The tips of the pressure terminals 27 are formed so as to be inserted into the hole 3d. The diameter of the hole 3d is smaller than the nominal outer diameter of the spring forked portions 27b so that they are compressedly brought into contact with the inner surface of the hole 3d. Therefore, when the spring forked portions 27b of the pressure terminals 27 are inserted into the hole 3d, the pressure terminals 27 can be easily and certainly fixed to the metal terminal 3.

The surface of the pressure terminals 27 are made of a metal material or a conductive material in order to have conductivity. The hole 3d may perforate through the metal terminal, or may have a bottom.

The present invention may be embodied in other specific forms without departing from the spirit or essential attributes thereof and, accordingly, reference should be made to the appended claims, rather than to the foregoing specification, as indicating the scope of the invention.

What is claimed is:

1. A high voltage ceramic capacitor, comprising:
   a capacitor device comprising a dielectric ceramic capacitor body having first and second opposed surfaces and first and second electrodes located on said first and second surfaces, respectively;
   first and second metal terminals connected to said first and second electrodes, respectively;
   a ceramic housing having a housing cavity which houses said capacitor device and at least a portion of said first and second metal terminals; and
   first and second resin layers provided in said housing cavity and surrounding at least a portion of said first and second metal terminals, respectively, said first and second resin layers being separated by an empty space therebetween.

2. A high voltage ceramic capacitor according to claim 1, wherein said capacitor body is cylindrical in shape.

3. A high voltage ceramic capacitor according to claim 2, wherein said space between said first and second resin layers extends along the direction of a central axis of said cylindrical capacitor body.

4. A high voltage ceramic capacitor according to claim 1, wherein an epoxy resin surrounds said capacitor device.

5. A high voltage ceramic capacitor according to claim 4, wherein said capacitor device is encapsulated by said first and second metal terminals and said epoxy resin.

6. A high voltage ceramic capacitor according to claim 5, wherein a portion of at least one of said metal terminals extends outside of said housing.

7. A high voltage ceramic capacitor according to any one of claims 1–6, wherein said first and second resin layers are formed of an epoxy resin.

8. A high voltage ceramic capacitor according to claim 1, wherein said resin layers are cured at a temperature above the maximum operating temperature of said capacitor device.

9. A high voltage ceramic capacitor according to any one of claims 1 to 6, wherein said ceramic housing comprises a housing body having an opening at a first surface of said capacitor device and a lid member fixed to said housing body so as to close said opening.

10. A high voltage ceramic capacitor according to claim 9, wherein said ceramic housing comprises aluminum oxide.

11. A high voltage ceramic capacitor according to claim 10, wherein said aluminum oxide contains five percent by weight or less of silicon.

12. A high voltage ceramic capacitor according to claim 7, wherein said ceramic housing comprises a housing body having an opening at a first surface of said capacitor device, and a lid member fixed to said housing body so as to close said opening.

13. A high voltage ceramic capacitor according to claim 12, wherein said ceramic housing comprises aluminum oxide.

14. A high voltage ceramic capacitor according to claim 13, wherein said aluminum oxide contains five percent by weight or less of silicon.

15. A high voltage ceramic capacitor according to claim 1, wherein said first and second resin layers extend around an outer periphery of said first and second metal terminals respectively.

* * * * *